United States Patent
Jacobs

(10) Patent No.: US 9,089,113 B2
(45) Date of Patent: Jul. 28, 2015

(54) SHIPPING CONTAINER FOOD PRODUCTION MODULE

(75) Inventor: Thomas Cameron Jacobs, Saint Augustine, FL (US)

(73) Assignee: Alternative Building Systems, LLC, Saint Augustine, FL (US)

( * ) Notice: Subject to any disclaimer, the term of this patent is extended or adjusted under 35 U.S.C. 154(b) by 150 days.

(21) Appl. No.: 13/543,771

(22) Filed: Jul. 6, 2012

(65) Prior Publication Data

US 2013/0008386 A1    Jan. 10, 2013

Related U.S. Application Data

(60) Provisional application No. 61/571,905, filed on Jul. 7, 2011.

(51) Int. Cl.
| | |
|---|---|
| *A01K 63/02* | (2006.01) |
| *A01G 31/06* | (2006.01) |
| *A01K 63/00* | (2006.01) |
| *A01K 63/04* | (2006.01) |

(52) U.S. Cl.
CPC ............ *A01K 63/00* (2013.01); *A01K 63/02* (2013.01); *A01K 63/04* (2013.01)

(58) Field of Classification Search
USPC ......... 119/215, 217, 224, 226, 227, 246, 247, 119/248, 250; 47/59 R, 62 R, 62 C, 17, 66.6, 47/48.5, 65.9, 79
See application file for complete search history.

(56) References Cited

U.S. PATENT DOCUMENTS

| | | | | |
|---|---|---|---|---|
| 4,077,158 | A * | 3/1978 | England ................. | 47/59 R |
| 4,169,050 | A * | 9/1979 | Serfling et al. ............. | 210/602 |
| 5,046,451 | A * | 9/1991 | Inslee et al. ............. | 119/227 |
| 5,269,094 | A * | 12/1993 | Wolverton et al. ........... | 47/66.6 |
| 6,233,870 | B1 * | 5/2001 | Horibata .................. | 47/62 R |
| 6,896,804 | B2 * | 5/2005 | Haerther et al. ........... | 210/602 |
| 7,467,601 | B2 * | 12/2008 | Brauman ................ | 119/228 |
| 8,651,058 | B1 * | 2/2014 | Pierce ..................... | 119/215 |
| 2009/0107410 | A1 * | 4/2009 | Kania et al. ............. | 119/246 |
| 2009/0301399 | A1 * | 12/2009 | Brown et al. ............ | 119/226 |
| 2010/0031893 | A1 * | 2/2010 | Bodlovich et al. ....... | 119/227 |
| 2013/0152469 | A1 * | 6/2013 | Kao ..................... | 47/62 R |

* cited by examiner

*Primary Examiner* — Rob Swiatek
*Assistant Examiner* — Lisa Tsang
(74) *Attorney, Agent, or Firm* — Lyman H. Smith

(57) ABSTRACT

A sustainable food production system, known as aquaponics, is housed in at least a portion of an intermodal shipping container. In some embodiments, the food production system can be housed fully in one intermodal shipping container or may span multiple shipping containers that can be stacked vertically, end-to-end or side-to-side. An ecosystem is created in the shipping containers where fish fertilize plants and plants clarify the water for the fish. The containers are designed to be plug-and-play and are expandable. Because they are intermodal (ISO) shipping containers, they can be easily shipped anywhere in the world. In the area of a standard parking space (8 feet by 20 feet), about 1,500 fish per year and hundreds of vegetables monthly can be raised.

9 Claims, 4 Drawing Sheets

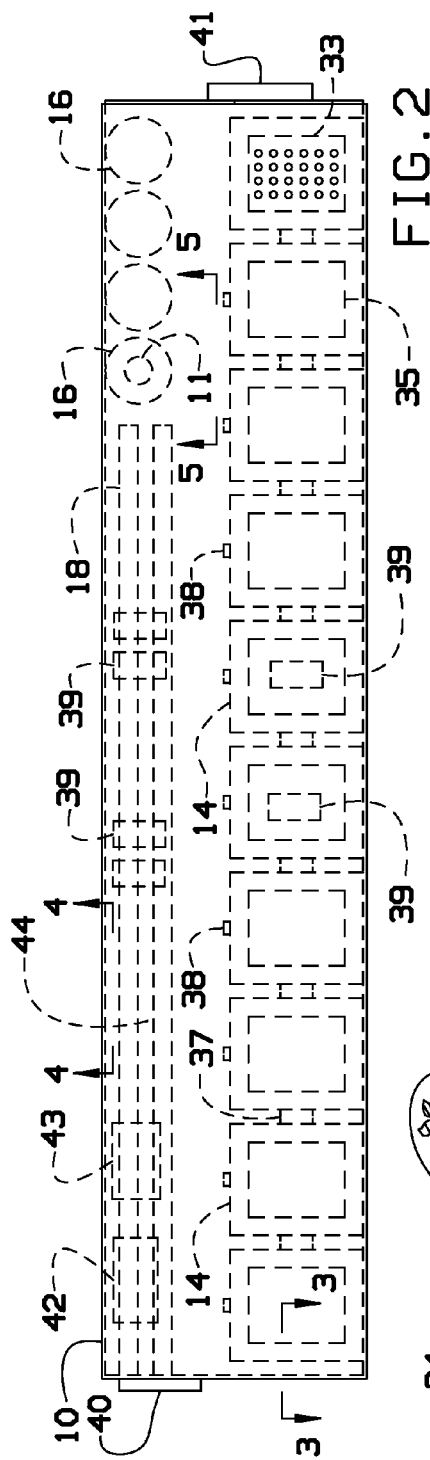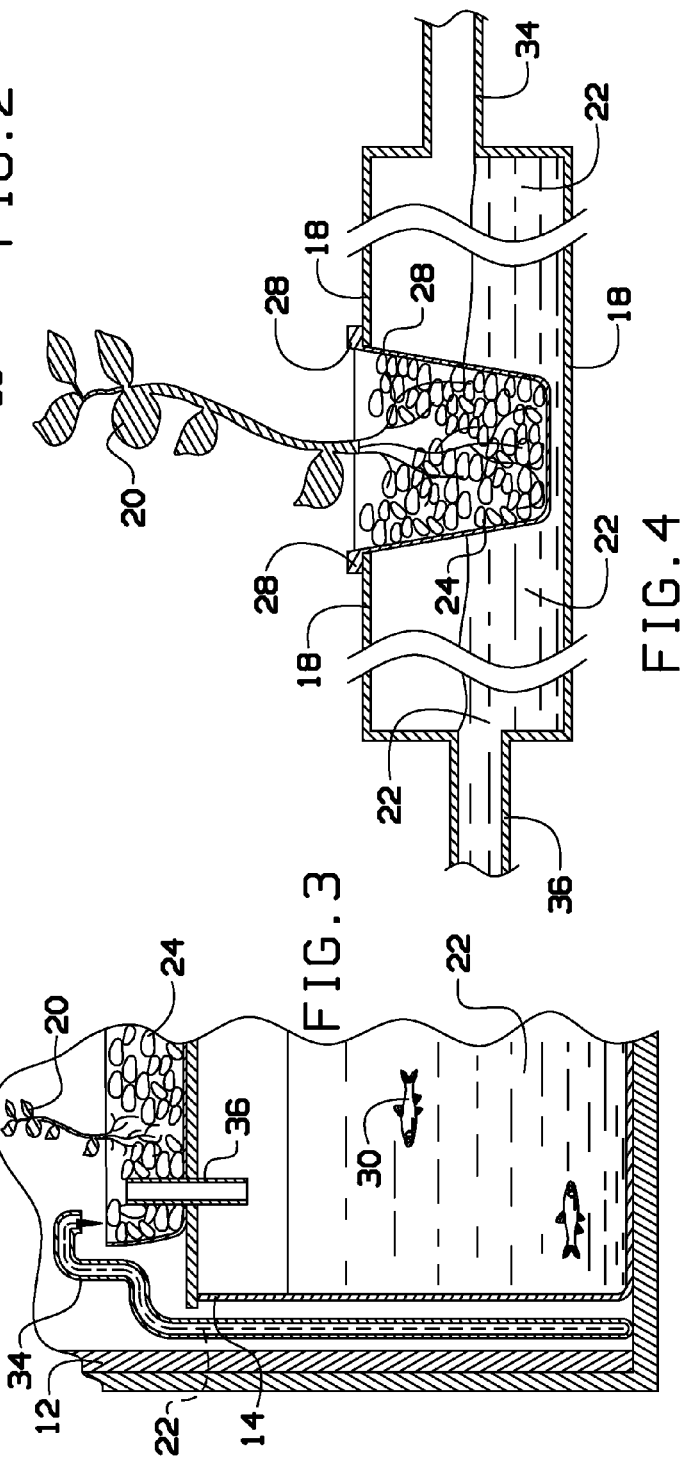

SHIPPING CONTAINER FOOD PRODUCTION MODULE

CROSS-REFERENCE TO RELATED APPLICATION

This application claims the benefit of priority of U.S. provisional application No. 61/571,905, filed Jul. 7, 2011, the contents of which are herein incorporated by reference.

BACKGROUND OF THE INVENTION

The present invention relates to aquaponics systems and methods and more particularly, to an intermodal shipping container (also referred to as an ISO shipping container) that is used to create a food production module.

There is a lack of sustainable organic systems to produce fresh vegetables and fish or other aquatic life in a limited space. In developing countries, there is a lack of sustainable food production facilities. Moreover, there is a lack of educational and therapeutic gardening systems for schools, veteran's programs and prisons.

In urban areas, there is limited space for urban farming but a need for fresh, organic-grown produce. Farming is not an option in many urban areas. Conventional farming requires a great deal of land and water. These resources are often unavailable or may have a limited available at a particular location or time.

Conventional aquaponic systems are set up outside or in green houses. They are not climate controlled and are not designed to be plug-and-play or to be shipped to different locations.

As can be seen, there is a need for an improved aquaponics system that can provide a sustainable organic food production system that can be easily set up, easily moved and can maximize the use of space.

SUMMARY OF THE INVENTION

In one aspect of the present invention, a food production module system comprises an intermodal container; a pump housed inside the intermodal container to transport water throughout the food product module system; a filtration canister system receiving water from one or more fish tanks; a pipe receiving water from the filtration canister system; a plurality of grow beds receiving water from the filtration system, wherein the one or more fish tanks receive water after passing through the pipe and through the plurality of grow beds.

In another aspect of the present invention, a portable food production module system organized in a portable container comprises a pump housed inside the portable container to transport water throughout the food product module system; a filtration canister system receiving water from one or more fish tanks, the one or more fish tanks being interconnected; a pipe receiving water from the filtration canister system; plant pots disposed in holes cut in the pipe; a plurality of grow beds receiving water from the filtration system; and a climate control system operable to maintain a desired temperature inside the portable container, wherein the one or more fish tanks receive water after passing through the pipe and through the plurality of grow beds.

These and other features, aspects and advantages of the present invention will become better understood with reference to the following drawings, description and claims.

BRIEF DESCRIPTION OF THE DRAWINGS

FIG. 2 is a top view of an ISO container food production module food production system according to an exemplary embodiment of the present invention;

FIG. 3 is a cross sectional view taken along line 3-3 of FIG. 2;

FIG. 4 is a cross sectional view taken along line 4-4 of FIG. 2;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a sustainable food production system, known as aquaponics, that is housed in at least a portion of an intermodal shipping container. In some embodiments, the food production system can be housed fully in one intermodal shipping container or may span multiple shipping containers that can be stacked vertically, end-to-end or side-to-side. An ecosystem is created in the shipping containers where fish fertilize plants and plants clarify the water for the fish. The containers are designed to be plug-and-play and are expandable. Because they are intermodal (ISO) shipping containers, they can be easily shipped anywhere in the world. In the area of a standard parking space (8 feet by 20 feet), about 1,500 fish per year and hundreds of vegetables monthly can be raised.

The system of the present invention uses up to 90% less water and requires very little land compared to conventional farming. The shipping containers can be stacked 5-10 units high and the plug-and-play climate controlled aspects means that they can be utilized basically anywhere. Use of solar panels to power pumps, lights and climate control and minimize the need for an external power supply. In addition, by incorporating a cistern system to collect rainwater, it could be a completely self-sufficient food production system.

Figure 1:
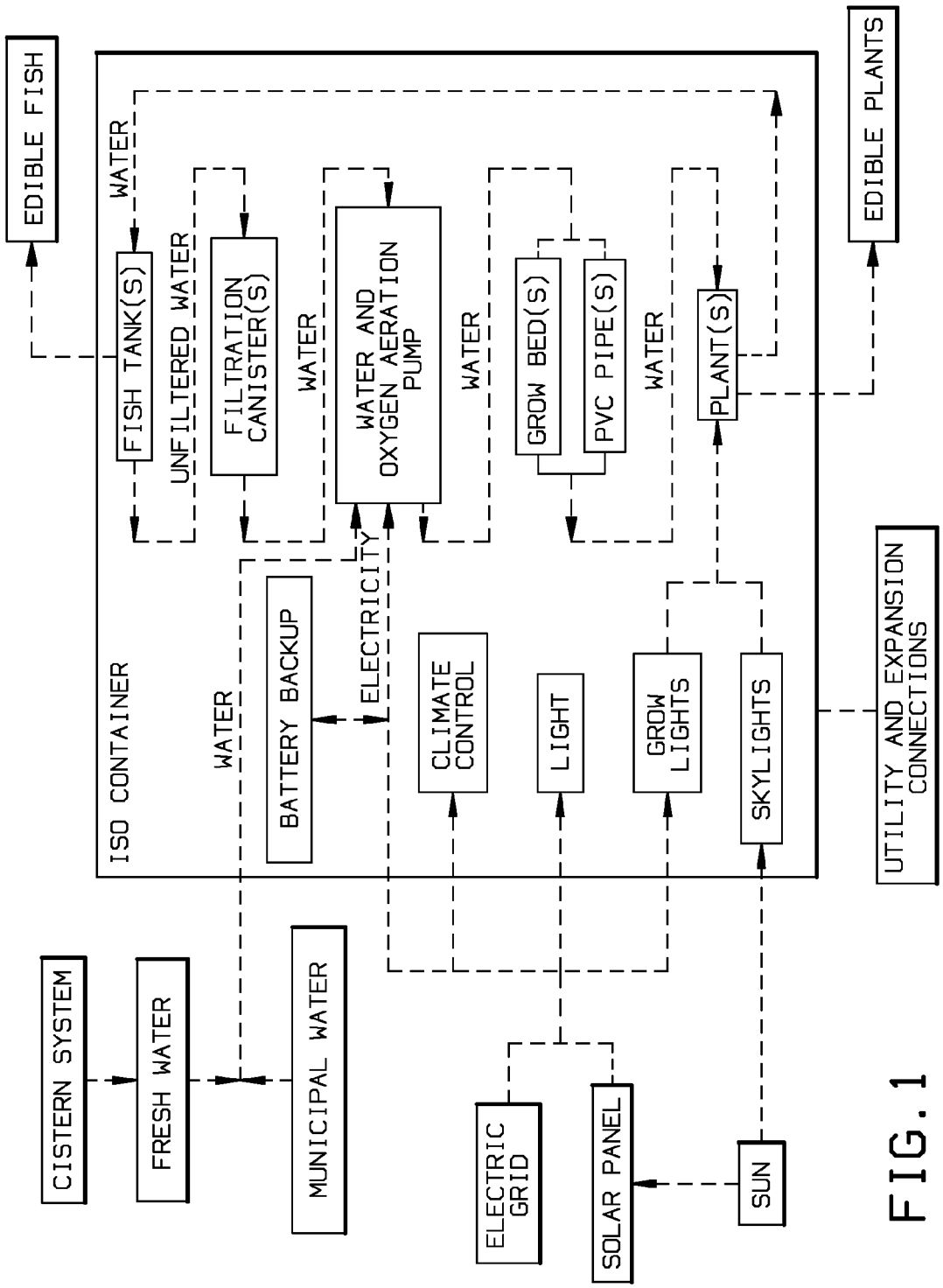
FIG. 1 is a schematic diagram of a food production module system according to an exemplary embodiment of the present invention.
Figure 6:
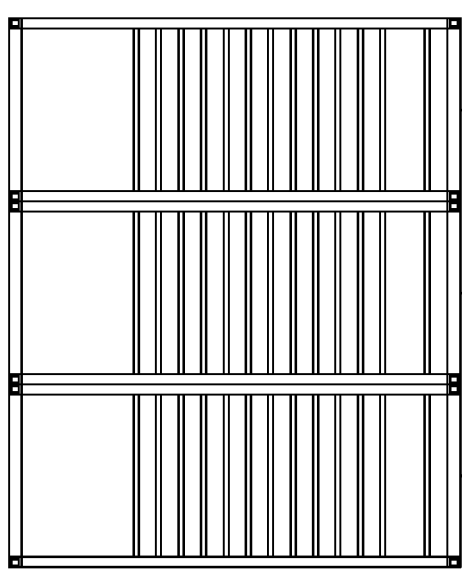
FIG. 6 is a side view of multiple ISO containers stacked vertically, according to an exemplary embodiment of the present invention.
Figure 5:
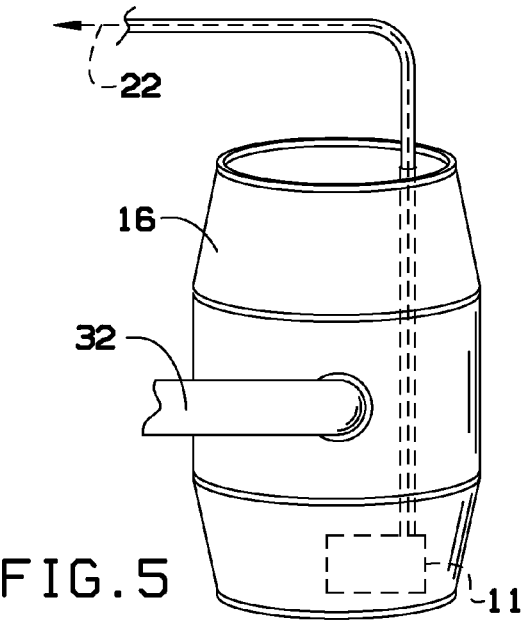
FIG. 5 is a cross sectional view taken along line 5-5 of FIG. 2.
Figure 7:
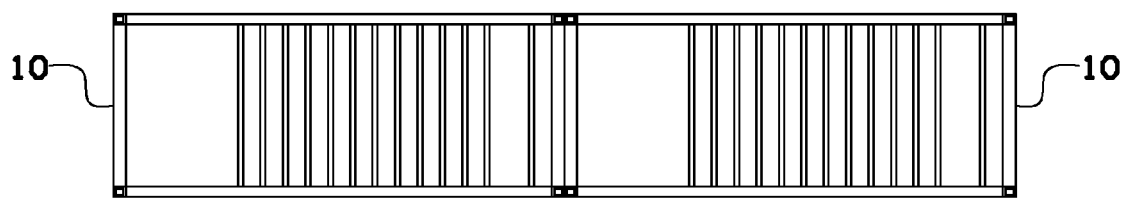
FIG. 7 is a side view of multiple ISO containers stacked end-to-end, according to an exemplary embodiment of the present invention.
Figure 8:
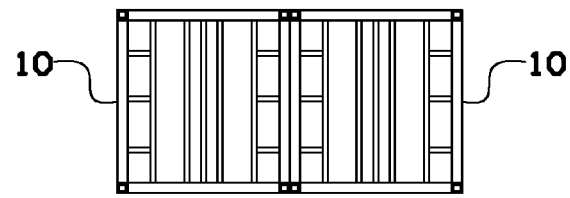
FIG. 8 is a front view of multiple ISO containers stacked side-to-side, according to an exemplary embodiment of the present invention.

Referring now to FIGS. 1 through 9, an ISO container 10 can house the components to transform the container 10 into a food production module. As shown in FIG. 1, these components can include fish tanks that can deliver unfiltered water to filtration canisters. These filtration canisters can have a design to permit reverse flow flushing when cleaning of the filtration canisters is needed. The filtration canisters can deliver water to a pump and aeration system, which can deliver the water to grow beds and plants via pipes. This water can be cycled back to the fish tanks and the cycle continues.

Water can be supplied to the container 10 from either fresh water through a cistern system, for example, or from municipal water. Power for the pumps, aeration devices, lights and grow lights can be supplied from either the electric grid or from solar powered solar panels. A battery back-up system can be provided to sustain plants and fish in the system until power is restored. In some embodiments, the system can be designed so that if power is lost, gravity drains the water to the fish containers, thus preventing a catastrophic loss of fish. The battery back-up system can keep the fish aerated until power is restored. Typically, the plants would not require immediate attention during a power outage.

Grow lights 39 and work lights can be provided inside the container 10 and a climate control system may be disposed in the container 10. The climate control system may be a simple fan, a heating system or a cooling system, or a combination thereof.

The container 10 can provide output of edible fish and edible plants. For example, a 10 foot section of a container can be used as a backyard garden or to educate children as a science project. These small units can produce 300-500 pounds of edible fish and hundreds of plants, such as lettuce, Swiss chard, tomatoes, herbs, strawberries and the like, all in a single school year. The students can learn and then the school can have a fish fry fundraiser. In some embodiments, the container 10 can be used not to produce edible fish and edible plants, but could be used to simply grow and raise fish and plants.

The containers can be used as urban farms or to supplement the food product purchased by restaurants. One standard parking space could house an 8-foot by 20-foot box which could produce 1,000-1,500 pounds of fish and hundreds of organic vegetables and herbs. People would come to eat and could check out the organic sustainable growing system.

Larger units could be developed by connecting containers either vertically (FIG. 6), end-to-end (FIG. 7), or side-by-side (FIG. 8), for example.

The container 10 could be sprayed with a spray insulation 12 or could be lined with a rigid foam insulation, for example. One or more access doors can be provided in the container 10 as desired.

FIG. 2 shows an exemplary design of the container 10. While not shown in FIG. 2, the container 10 can include the insulation 12 to assist in proper climate control. The container 10 can include a filtration canister system 16 having one or more pumps 11 (see FIG. 5) that pump water through barrel piping 32. A plurality of pipes 18, such as PVC pipe, can run along one wall of the container 10. As shown in FIG. 4, the pipe 18 can have an inlet 34 to deliver water 22 to the pipe 18, and an outlet 36 to flow water back to fish tanks 14. A plant pot 28 can be disposed in a cutout in the pipe 18. The plant pot 28 can include grow medium 24. The grow medium 24 can be, for example, light expanded clay aggregate (LECA). A plant 20 can grow in the grow medium 24, receiving nutrients from the water from the fish tanks 14. A germination area 44 can be provided under the pipes 18 to allow seeds to germinate before planting.

One or more breeder tanks 42 can be included in the container 10 for breeding fish. Additional, one or more fry tanks 43 can be used for allowing small fish to grow before being placed in the fish tanks 14.

Figure 9:
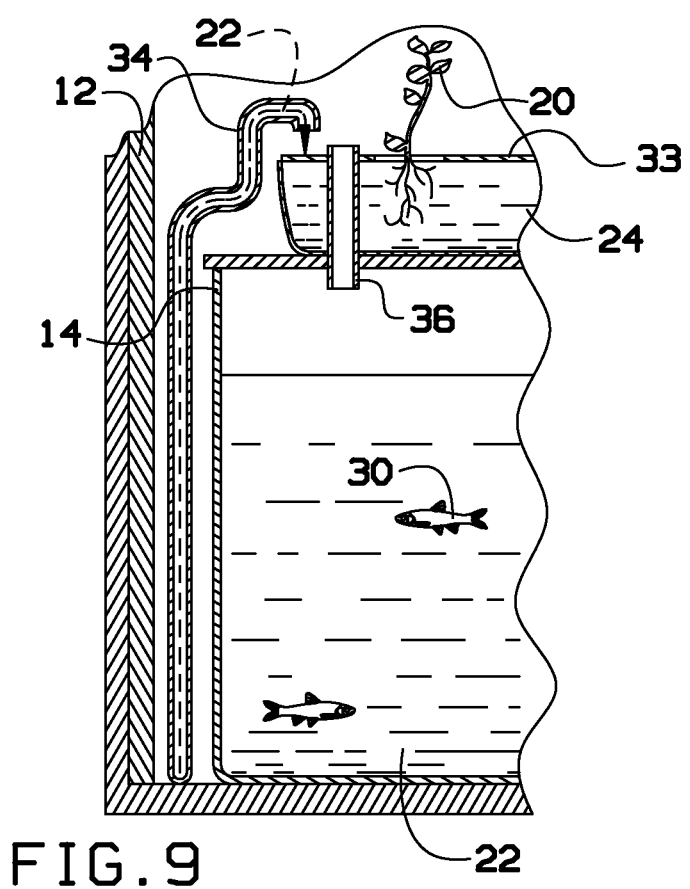
FIG. 9 is a cross sectional view, similar to FIG. 3, but showing a raft to hold plants in place in water in place of growing medium, according to an exemplary embodiment of the present invention.

A plurality of fish tanks 14 can be stored in the container 10. All the fish tanks 14 can be interconnected with pipes 37. The fish tanks 14 can include drains 38 to permit draining of the tanks as may be needed. Grow; beds 35 can be disposed on top of the fish tanks 14, as shown in FIGS. 3 and 9. The grow beds 35 can include a drain 36 to permit water to drain back into the fish tanks 14 when the water level gets to a predetermined level.

The grow beds 35 can include grow medium 24, as shown in FIG. 3, or may not include any grow medium, as shown in FIG. 9. In this case, a raft 33 can be disposed on top of the water's surface to support plants grown therein.

A climate control system 40 can be used to maintain proper temperatures within the container 10. The climate control system 40 can provide circulation, heating or cooling of the air temperature inside the container 10. The climate control system 40 can also be used to control humidity within the container 10 and may include appropriate devices to humidify and/or dehumidify the air inside the container 10.

A utility connection/expansion connection 41 can be provided to supply utilities to the container 10 or to interconnect multiple containers together. Various connections for electricity, water intake and water drainage can be provided at the utility connection/expansion connection 41.

Farming is not an option in many urban areas. Conventional farming requires a great deal of land and water. The system of the present invention uses up to 90% less water and requires very little land. The system can be stacked up to 10 high or as high as local building codes will allow. Urban coops can afford residents the ability to work together on small urban lots and share the harvest. These systems create an extremely high yields per acre. This makes them ideal for urban areas. They are also portable and can be set up on lots temporarily—just harvest the fish and plants, drain the tanks, and they can be moved around the corner or around the world if the climate is similar, as the units are designed for the climate they will be used in. This could encourage land owners to use vacant lots for food production and ease the problem known as "food deserts".

Science in Schools is an issue. The system of the present invention is a "science class in a box". The small systems are relatively easy to set up and easy to maintain. Schools could lease them for the year or they could be donated to the school. Prisons need activities. The systems provide a tranquil activity which can proverbially "Tame the Savage Beast". The water trickling, the vegetation growing and the feeding of the fish is all very therapeutic. The prison could reward good prisoners with fresh vegetables and a periodic fish fry. Developing countries, such as Haiti where the soil has been decimated, can use this system to grow crops and fish without soil. Solar panels can power the system and the cistern can supply the needed water. Discipline will have to be enforced to allow plants to grow (as little as 28 days) and for the fish to develop (as little as 9 months post hatching). Once the system is up and running a regular crop of fish and vegetables can be harvested. Obviously, a larger system could produce more food and provide more sustenance.

The system of the present invention could be an addition to restaurants. Such facilities could place a system in a space smaller than a standard parking space and supplement the fish and vegetables needed to operate the restaurant. Herbs could be completely provided to support a restaurant.

Food production is one of the most, if not the most important functions of mankind. The system of the present invention can teach a man to fish . . . not just give him a fish. As we have all heard, "You give a man a fish he eats for a day, you teach a man to fish he eats for a lifetime."

As used herein, the term "food production module" can not only be used for food, plant, fish production, but could also be used for growing and raising plants and fish, with or without the intention of using those plants and fish as a food source.

It should be understood, of course, that the foregoing relates to exemplary embodiments of the invention and that modifications may be made without departing from the spirit and scope of the invention as set forth in the following claims.

What is claimed is:

1. A food production module system comprising:
    a portable, intermodal container having an undivided interior volume;
    a pump housed inside the intermodal container to transport water throughout the food production module system;
    a filtration canister system, housed inside the intermodal container, receiving water from a plurality of fluidly interconnected fish tanks housed inside the intermodal container;
    a pipe, housed inside the intermodal container, receiving water from the filtration canister system; and
    a plurality of grow beds, housed inside the intermodal container, receiving water from the filtration system, wherein
    the plurality of fish tanks receive water after the water passes through the pipe and through the plurality of grow beds,
    the entire food production module system operates within the portable, intermodal container, and
    the entire food production module system is entirely above ground when in use.

2. The food production module system of claim 1, further comprising plant pots disposed in holes cut in the pipe.

3. The food production module system of claim 2, wherein the plant pots include a grow media.

4. The food production module system of claim 1, further comprising a climate control system operable to maintain a desired temperature inside the intermodal container.

5. The food production module system of claim 1, further comprising insulation disposed along an inside of the intermodal container.

6. The food production module system of claim 1, further comprising a breeder tank.

7. The food production module system of claim 1, further comprising a fry tank.

8. A portable food production module system organized in an undivided interior volume of a portable container, the system comprising:
    a pump housed inside the portable container to transport water throughout the food production module system;
    a filtration canister system, housed inside the portable container, receiving water from one or more fish tanks, the one or more fish tanks being interconnected and housed inside the portable container;
    a pipe, housed inside the portable container, receiving water from the filtration canister system;
    plant pots disposed in holes cut in the pipe;
    a plurality of grow beds, housed inside the portable container, receiving water from the filtration system; and
    a climate control system operable to maintain a desired temperature inside the portable container, wherein
    the one or more fish tanks receive water after the water passes through the pipe and through the plurality of grow beds, and
    the entire food production module operates within the portable container.

9. The food production module system of claim 8, further comprising:
    a breeder tank; and
    a fry tank.

* * * * *